(12) United States Patent
Solbrig (10) Patent No.: US 7,886,527 B2
(45) Date of Patent: Feb. 15, 2011

(54) REDUCTANT INJECTION CONTROL STRATEGY

(75) Inventor: Charles E. Solbrig, Ypsilanti, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/044,303

(22) Filed: Mar. 7, 2008

(65) Prior Publication Data

US 2008/0250774 A1 Oct. 16, 2008

Related U.S. Application Data

(60) Provisional application No. 60/922,621, filed on Apr. 10, 2007.

(51) Int. Cl.
*F01N 3/00* (2006.01)
(52) U.S. Cl. .............. 60/286; 60/274; 60/276; 60/295; 60/303
(58) Field of Classification Search ............ 60/276, 60/286, 295, 301, 303, 274
See application file for complete search history.

(56) References Cited

U.S. PATENT DOCUMENTS

| | | | |
|---|---|---|---|
| 6,367,450 B1 * | 4/2002 | Kato ............... | 123/406.26 |
| 6,427,439 B1 * | 8/2002 | Xu et al. .......... | 60/286 |
| 6,532,736 B2 * | 3/2003 | Hammerle et al. ...... | 60/286 |
| 6,698,188 B2 * | 3/2004 | Irisawa et al. ........ | 60/285 |
| 6,959,540 B2 * | 11/2005 | Itoh et al. ........ | 60/286 |
| 7,028,465 B2 * | 4/2006 | Ripper et al. ...... | 60/286 |
| 7,086,222 B2 * | 8/2006 | Itoh et al. ........ | 60/286 |
| 7,093,427 B2 * | 8/2006 | van Nieuwstadt et al. ..... | 60/286 |
| 7,418,816 B2 * | 9/2008 | Upadhyay et al. ...... | 60/285 |
| 7,546,728 B2 * | 6/2009 | Ripper et al. ...... | 60/286 |
| 2002/0182127 A1 * | 12/2002 | Braun et al. ........ | 422/172 |
| 2004/0055284 A1 | 3/2004 | Ripper et al. | |
| 2007/0137181 A1 * | 6/2007 | Upadhyay et al. ...... | 60/286 |
| 2007/0144151 A1 * | 6/2007 | Lueders et al. ........ | 60/286 |
| 2007/0256405 A1 * | 11/2007 | Gabe et al. ........ | 60/274 |
| 2008/0216463 A1 * | 9/2008 | Chaineux et al. ...... | 60/274 |

FOREIGN PATENT DOCUMENTS

WO WO 2006027903 A1 * 3/2006

* cited by examiner

*Primary Examiner*—Tu M Nguyen (57) ABSTRACT

A base dose module generates a base dose signal that corresponds to a mass flow rate of a dosing agent. A dose adjustment module receives an ammonia (NH3) signal and determines a first dose adjustment based upon the NH3 signal. The NH3 signal indicates NH3 measured downstream of a catalyst. The dose determination module generates a dosing signal based upon the base dose signal and the first dose adjustment.

16 Claims, 6 Drawing Sheets

REDUCTANT INJECTION CONTROL STRATEGY

CROSS-REFERENCE TO RELATED APPLICATIONS

This application claims the benefit of U.S. Provisional Application No. 60/922,621, filed on Apr. 10, 2007. The disclosure of the above application is incorporated herein by reference in its entirety.

FIELD

The present disclosure relates to vehicle emissions and more particularly to selective catalytic reduction.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
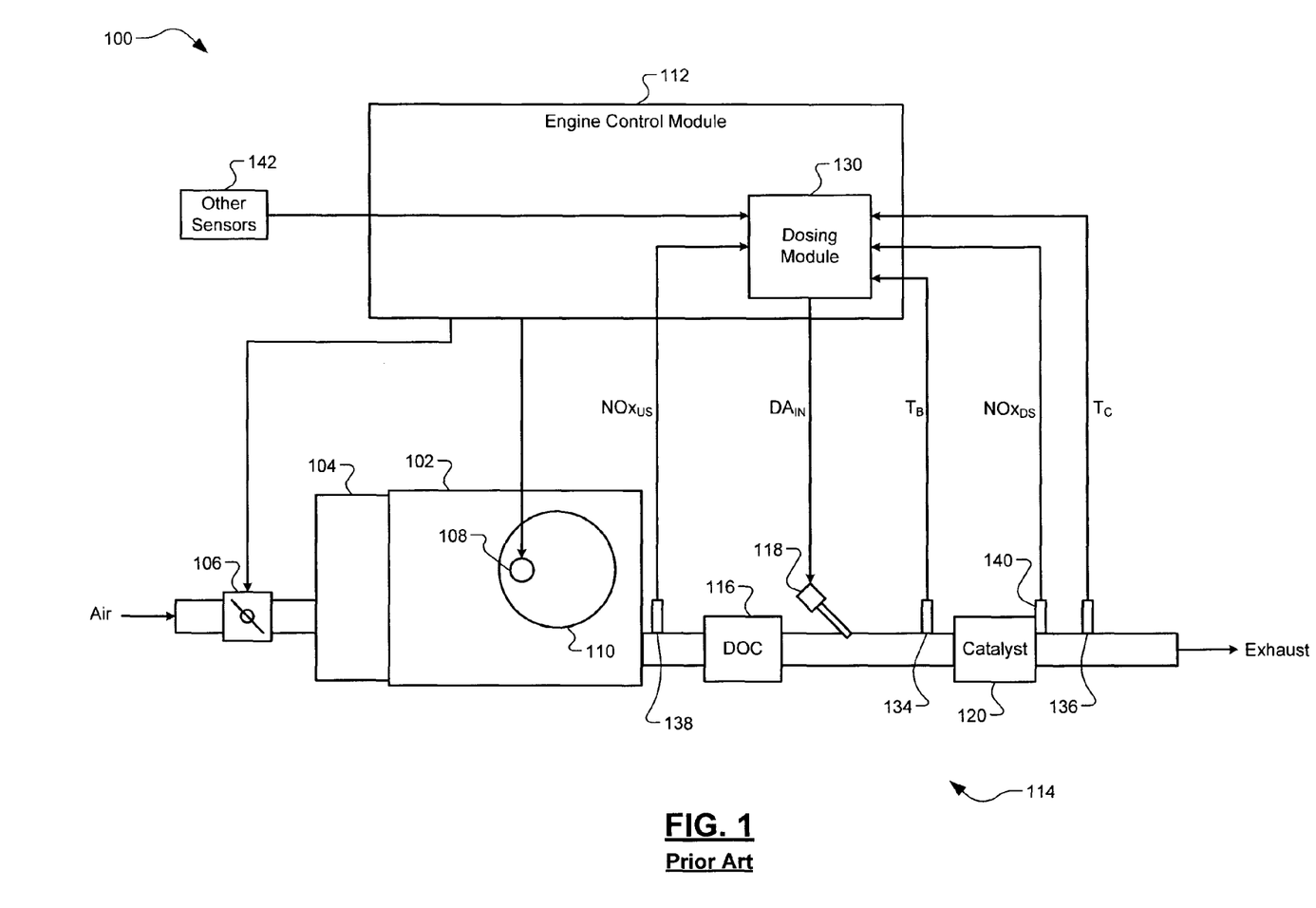
FIG. 1 is a functional block diagram of an engine system according to the prior art.

Referring now to FIG. 1, a functional block diagram of an engine system 100 is presented. Air is drawn into an engine 102 through an intake manifold 104. The volume of air drawn into the engine 102 is varied by a throttle valve 106. The air mixes with fuel from one or more fuel injectors 108 to form an air/fuel mixture. The air/fuel mixture is combusted within one or more cylinders 110 of the engine 102 to generate torque. An engine control module (ECM) 112 modulates torque output by the engine 102 via, for example, the fuel injector 108 and/or the throttle valve 106.

Exhaust resulting from the combustion of the air/fuel mixture is expelled from the cylinders to an exhaust system. The exhaust may include particulate matter (PM) and gas. More specifically, the exhaust gas may include nitrogen oxides (NOx), such as nitrogen oxide (NO) and nitrogen dioxide ($NO_2$). The exhaust system includes a treatment system 114 that, among other things, reduces the respective amounts of NOx and PM in the exhaust.

The treatment system 114 includes a diesel oxidation catalyst (DOC) 116, a dosing agent injector 118, and a catalyst 120. The DOC 116 removes, for example, hydrocarbons and/or carbon oxides from the exhaust. The dosing agent injector 118 injects a dosing agent into the exhaust stream, upstream of the catalyst 120. The catalyst 120, more specifically, is a selective catalytic reduction (SCR) catalyst. The dosing agent reacts with NOx in the exhaust passing the SCR catalyst 120 resulting in nitrogen ($N_2$) and water ($H_2O$).

The ECM 112 includes a dosing module 130 that controls the mass flow rate of dosing agent injected ($DA_{IN}$) via the dosing agent injector 118. The dosing module 130 adjusts $DA_{IN}$ based upon signals from one or more NOx sensors 138 and 140 and/or signals from one or more temperature sensors 134 and 136. Additionally, the dosing module 130 may adjust $DA_{IN}$ based upon signals from other sensors 142. For example only, the other sensors 142 may include a manifold absolute pressure (MAP) sensor, a mass air flow (MAF) sensor, a throttle position sensor (TPS), an intake air temperature (IAT) sensor, and/or any other suitable sensor.

To perform a NOx reduction, the SCR catalyst 120 stores $NH_3$ provided by the dosing agent. The mass of $NH_3$ stored by the SCR catalyst 120 is referred to as current storage. The percentage (e.g., 0-100%) of NOx that is removed from the exhaust is referred to as conversion efficiency and is dependent upon current storage. For example only, as current storage increases, conversion efficiency also increases.

To maintain a predetermined conversion efficiency, the dosing module 130 adjusts $DA_{IN}$ to provide a corresponding current storage. However, the SCR catalyst 120 may be capable of storing up to a maximum mass of $NH_3$, which is referred to as maximum storage capacity. Conversion efficiency may be maximized when the current storage of the SCR catalyst 120 is at maximum storage capacity. Accordingly, the dosing module 130 adjusts $DA_{IN}$ to maintain current storage at or near the maximum storage capacity to maximize conversion efficiency.

SUMMARY

A dosing module for a vehicle comprises a base dose module, a dose adjustment module, and a dose determination module. The base dose module generates a base dose signal that corresponds to a mass flow rate of a dosing agent. The dose adjustment module receives an ammonia (NH3) signal and determines a first dose adjustment based upon the NH3 signal. The NH3 signal indicates NH3 measured downstream of a catalyst. The dose determination module generates a dosing signal based upon the base dose signal and the first dose adjustment.

In other features, an exhaust treatment system comprises the dosing module, an NH3 sensor, and a dosing agent injector. The NH3 sensor generates the NH3 signal. The dosing agent injector supplies the dosing agent to the catalyst based upon the dosing signal. The dose adjustment module comprises a lookup table of dose adjustment indexed by NH3 signal, and the dose adjustment module determines the first dose adjustment further based upon the lookup table.

In still other features, the dosing module further comprises a comparison module that compares the NH3 signal with a threshold and that generates a slip signal having one of a first state and a second state based upon the comparison. The comparison module generates the slip signal having the first state when the NH3 signal is greater than the threshold.

In further features, the dosing module further comprises a max storage module and a current storage module. The max storage module determines a max NH3 storage capacity of the catalyst. The current storage module determines a mass of NH3 stored by the catalyst and sets the stored mass equal to the maximum storage capacity after the slip signal having the first state is generated.

In still further features, the dosing module further comprises a storage ratio module, a storage adjustment module, and a selector module. The storage ratio module determines a storage ratio based upon the stored mass and the maximum storage capacity. The storage adjustment module determines a second dose adjustment based upon the storage ratio. The selector module selects one of the first dose adjustment and the second dose adjustment based upon the slip signal. The dose determination module generates the dosing signal based upon the base dose signal and the selected dose adjustment.

In still other features, the selector module selects the first dose adjustment when the slip signal having the first state is generated. The storage adjustment module determines the second dose adjustment based upon a fraction of the storage ratio. The fraction is determined based upon a signal indicating temperature of the catalyst.

A method comprises generating a base dose signal that corresponds to a mass flow rate of a dosing agent, determining a first dose adjustment based upon an ammonia (NH3) signal, and generating a dosing signal based upon the base dose signal and the first dose adjustment. The NH3 signal indicates NH3 measured downstream of a catalyst.

In other features, the method further comprises supplying the dosing agent to the catalyst based upon the dosing signal. The method further comprises determining the first dose adjustment further based upon a lookup table of dose adjustment indexed by NH3 signal. The method further comprises comparing the NH3 signal with a threshold and generating a slip signal having one of a first state and a second state based upon the comparison. The slip signal having the first state is generated when the NH3 signal is greater than the threshold.

In further features, the method further comprises determining a maximum NH3 storage capacity of the catalyst, determining a mass of NH3 stored by the catalyst, and setting the stored mass equal to the maximum storage capacity after the slip signal having the first state is generated.

In still further features, the method further comprises determining a storage ratio based upon the stored mass and the maximum storage capacity, determining a second dose adjustment based upon the storage ratio, selecting one of the first dose adjustment and the second dose adjustment based upon the slip signal, and generating the dosing signal based upon the base dose signal and the selected dose adjustment.

In still other features, the method further comprises selecting the first dose adjustment when the slip signal having the first state is generated. The method further comprises determining the second dose adjustment based upon a fraction of the storage ratio. The method further comprises determining the fraction based upon a signal indicating temperature of the catalyst.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In normal operation, a dosing agent controller attempts to maximize conversion efficiency by adjusting the mass flow rate of dosing agent injected ($DA_{IN}$) to maintain current storage of a selective catalytic reduction (SCR) catalyst at or near maximum storage capacity. However, if dosing agent is injected such that the current storage would exceed the maximum storage capacity, amonia ($NH_3$) may be emitted from a vehicle, which is referred to as slip. The dosing agent controller determines the current storage and the maximum storage capacity to both maximize conversion efficiency and minimize slip.

Maximum storage capacity has an inverse relationship with temperature of the SCR catalyst. For example, as SCR temperature increases, maximum storage capacity decreases. Accordingly, the maximum storage capacity may be determined based upon a mapping of SCR temperature to maximum storage capacity. Other parameters may also be used to determine the maximum storage capacity, such as flow rate of the exhaust gas, concentration of nitrogen dioxide ($NO_2$) in the exhaust gas, and/or any other suitable parameter.

In contrast, determining the current storage may involve a more complex analysis, as discussed in detail below. For example, the dosing agent controller may determine current storage based upon the mass of $NH_3$ supplied to the SCR catalyst ($NH3_{IN}$) and the mass of $NH_3$ consumed ($NH3_{USED}$) during a predetermined period of time.

However, determining $NH3_{IN}$ and/or $NH3_{USED}$ may involve a number of variables that may each be affected by environmental and/or system conditions, thereby introducing the possibility of error into the current storage calculation. Accordingly, the dosing agent controller may unknowingly cause slip while attempting to maintain the current storage at a desired level, such as at or near the maximum storage capacity. Alternatively, the dosing agent controller may cause a lower conversion efficiency.

The dosing agent controller may accurately detect when slip occurs by measuring the concentration of $NH_3$ downstream of the SCR catalyst using an NH3 sensor. When slip is detected, the dosing agent controller begins reducing $DA_{IN}$ based upon the measured $NH_3$ concentration. For example only, the dosing agent controller may increasingly reduce $DA_{IN}$ as $NH_3$ concentration increases. Accordingly, the dosing agent controller may both maximize conversion efficiency and minimize slip.

Furthermore, the dosing agent controller may set the current storage equal to the maximum storage capacity when slip is occurring since slip only occurs when current storage exceeds the maximum storage capacity. This updates the current storage to an accurate value from which the dosing agent controller may use in the normal operation after slip ceases.

Figure 2:
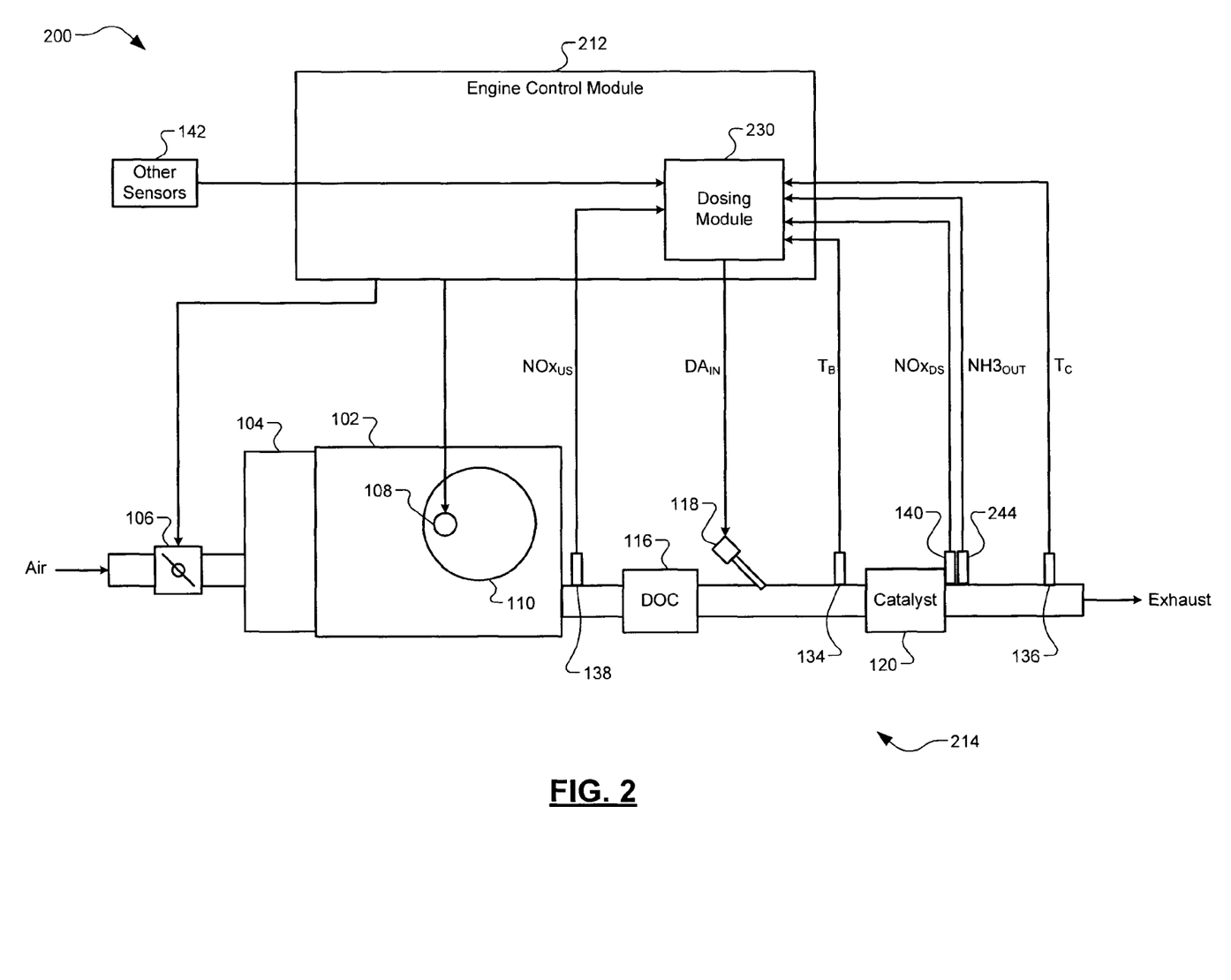
FIG. 2 is a functional block diagram of an exemplary engine system according to the principles of the present disclosure.

Referring now to FIG. 2, a functional block diagram of an exemplary engine system 200 is presented. The engine 102 may be any suitable type of engine, such as a gasoline-type internal combustion engine, a diesel-type internal combustion engine, or a hybrid-type engine. The engine 102 generates torque by combusting an air/fuel mixture within cylinders of the engine 102. For example only, the engine 102 may include 2, 3, 4, 5, 6, 8, 10, or 12 cylinders. The combustion of the air/fuel mixture results in exhaust.

The exhaust is expelled from the cylinders to an exhaust system. The exhaust system includes a treatment system 214 that, among other things, reduces the amount of nitrogen oxides (NOx), such as nitrogen oxide (NO) and nitrogen dioxide (NO$_2$) in the exhaust. The treatment system 214 includes the diesel oxidation catalyst (DOC) 116, the dosing agent injector 118, and the SCR catalyst 120. For example only, the SCR catalyst 120 may include a vanadium catalyst, a zeolite catalyst, and/or any other suitable catalyst. The SCR catalyst 120 may be implemented with a diesel particulate filter (DPF) or in any other suitable configuration.

The treatment system 214 also includes the NOx sensors 138 and 140 and may include one or more of the temperature sensors 134 and 136. The temperature sensors 134 and 136 may be located in various places throughout the exhaust system. For example only, the temperature sensor 134 may be downstream of the DOC 116 and upstream of the SCR catalyst 120, and the temperature sensor 136 may be downstream of the SCR catalyst 120. The temperature sensors 134 and 136 each provide a signal indicating a temperature of the exhaust at their location, referred to as $T_B$, and $T_C$, respectively.

The NOx sensor 138 is located upstream of the DOC 116 and provides a signal indicating a concentration of NOx in the exhaust, referred to as $NOx_{US}$ (ppm). The NOx sensor 140 is located downstream of the SCR catalyst 120 and provides a signal indicating a concentration of NOx in the exhaust, referred to as $NOx_{DS}$ (ppm). The NOx sensor 140 may be cross sensitive to NH3 in the exhaust.

An engine control module (ECM) 212 modulates the torque output of the engine 102. The ECM 212 includes a dosing module 230 that controls $DA_{IN}$ (g/s), i.e., the mass flow rate of dosing agent supplied to the SCR catalyst 120. For example only, the dosing agent may be urea, amonia (NH$_3$), or any other suitable dosing agent. In instances where urea is used as the dosing agent, it reacts with the exhaust gas, resulting in NH$_3$. The SCR catalyst 120 stores NH$_3$ and catalyzes a reaction between the stored NH$_3$ and NOx passing the SCR catalyst 120.

NOx and NH$_3$ react at a known rate, referred to as $k_{3OX}$, which is described by the equation:

$$k_{3OX} = \frac{x \, \text{mol} \, NH_3}{1 \, \text{mol} \, NO_X} \quad (1)$$

where x varies from 1.0 to 1.333, depending on the amount of NO$_2$ in the exhaust. The dosing module 230 determines a base dose, which is referred to as $DA_{BASE}$ (g/s). In various implementations, the dosing module 230 determines $DA_{BASE}$ based upon $NOx_{US}$. For example only, $DA_{BASE}$ may be the amount of dosing agent (mols) necessary to produce a stoichiometric mixture of NH$_3$ and NOx, upstream of the SCR catalyst 120.

The dosing module 230 determines the current storage (g) and the maximum storage capacity (g) of the SCR catalyst 120 based upon known values and signals from various sensors, as described in detail below. The dosing module 230 determines a storage ratio based upon the current storage and the maximum storage capacity. The dosing module 230 determines a dose adjustment based upon the storage ratio. This dose adjustment will be referred to as a second dose adjustment.

The treatment system 214 further includes an NH3 sensor 244, which is located downstream of the SCR catalyst 120. The NH3 sensor 244 provides a signal indicating a concentration of NH$_3$ in the exhaust, which is referred to as $NH3_{OUT}$ (ppm). More specifically, $NH3_{OUT}$ indicates the concentration of NH$_3$ apart from other components of the exhaust, such as NOx. The dosing module 230 determines another dose adjustment based upon $NH3_{OUT}$. This dose adjustment will be referred to as a first dose adjustment.

The dosing module 230 determines whether slip is occurring based upon $NH3_{OUT}$. In various implementations, the dosing module 230 determines that slip is occurring when $NH3_{OUT}$ is greater than a threshold, referred to as a slip threshold. For example only, the slip threshold may be 2.0 ppm NH$_3$.

The dosing module 230 selects one of the first and second dose adjustments based upon whether slip is occurring. For example only, the dosing module 230 selects the first dose adjustment when slip is occurring. The dosing module 230 then adjusts $DA_{BASE}$ based upon the selected dose adjustment, thereby generating $DA_{IN}$.

In other words, when slip is not occurring, the dosing module 230 adjusts $DA_{BASE}$ based upon the second dose adjustment (i.e., the storage ratio). This method is discussed in detail in commonly assigned U.S. patent application Ser. No. 11/786,036, filed on Apr. 10, 2007, the disclosure of which is incorporated herein by reference in its entirety. When slip is occurring, the dosing module 230 adjusts $DA_{BASE}$ based upon the first dose adjustment (i.e., based upon $NH3_{OUT}$).

Furthermore, the dosing module 230 may set the current storage equal to the max storage capacity when slip is occurring. This allows the dosing module 230 to update the current storage to a known value, as slip only occurs when the current storage is equal to maximum storage capacity. When slip ceases, the dosing module 230 returns to adjusting $DA_{BASE}$ based upon the second dose adjustment (i.e., based upon the storage ratio).

Figure 3A:
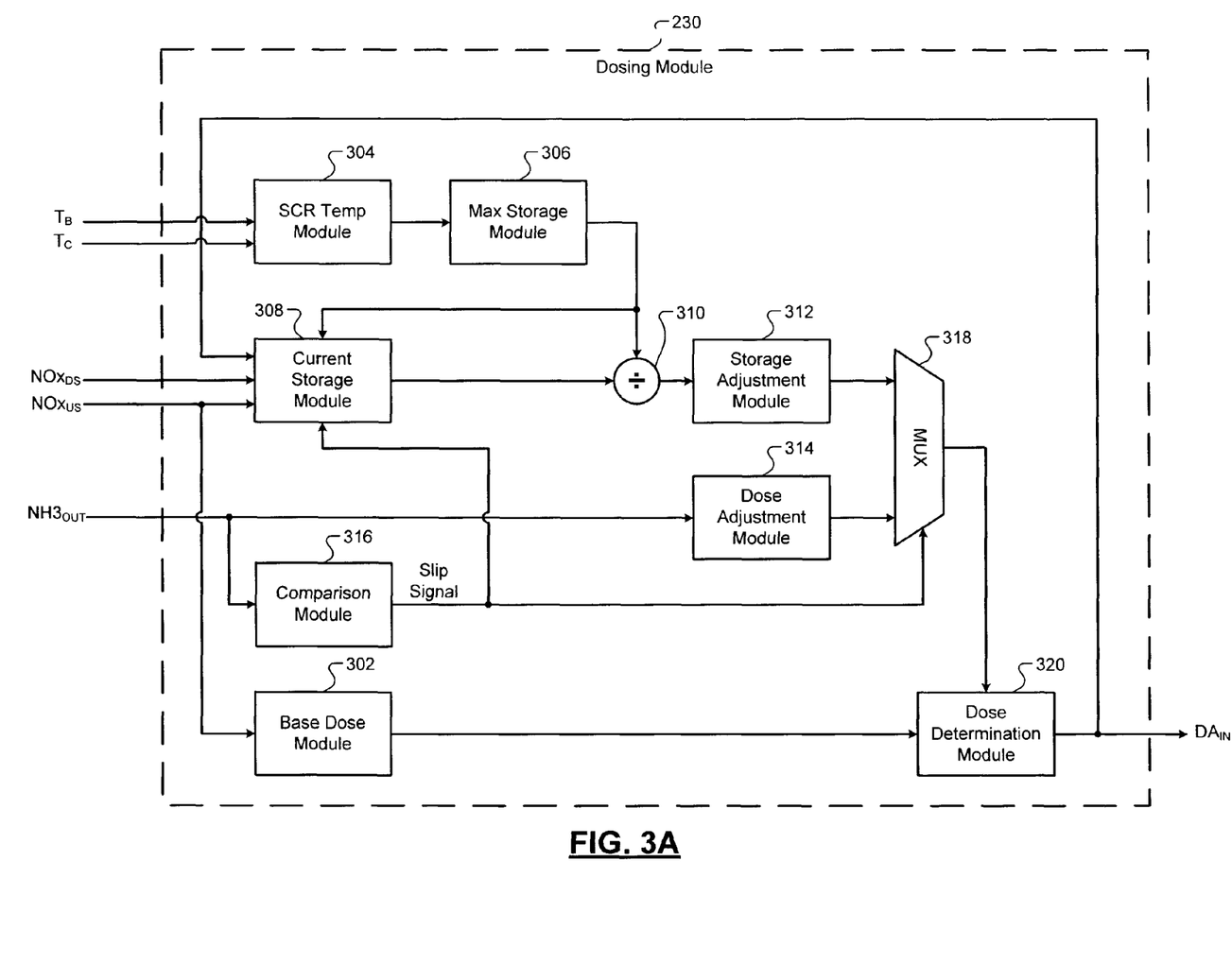
FIGS. 3A-3B are functional block diagrams of exemplary implementations of a dosing module according to the principles of the present disclosure.

Referring now to FIG. 3, a functional block diagram of an exemplary implementation of the dosing module 230 is presented. The dosing module 230 includes a base dose module 302, an SCR temp module 304, a max storage module 306, a current storage module 308, a storage ratio module 310, and a storage adjustment module 312. The dosing module 230 also includes a dose adjustment module 314, a comparison module 316, a selector module 318, and a dose determination module 320.

The base dose module 302 determines $DA_{BASE}$ based upon, for example, $NOx_{US}$. The SCR temp module 304 determines the SCR temperature based upon, for example, temperatures $T_B$, and $T_C$, from the temperature sensors 134 and 136, respectively. Alternatively, the SCR temperature may be provided to the SCR temp module 304 by a sensor that measures the SCR temperature, any other suitable sensor, or a model.

The max storage module 306 determines the maximum storage capacity of the SCR catalyst 120 based upon the SCR temperature. For example only, the max storage capacity may be determined based upon a mapping of SCR temperature to maximum storage capacity. This mapping may be implemented in, for example, nonvolatile or volatile memory. Additionally, the max storage capacity may be based upon other characteristics such as aging and/or MAF.

The current storage module 308 determines the current storage of the SCR catalyst 120. The current storage module 308 may determine the current storage based upon $NH3_{IN}$ and $NH3_{USED}$ during a predetermined period of time. The current storage module 308 may determine the current storage at a predetermined interval, such as every 0.1 seconds. The current storage module 308 may determine $NH3_{IN}$ based upon, for example, $DA_{IN}$, the concentration of the dosing agent ($DA_{CONC}$), the rate at which the dosing agent decomposes into $NH_3$ ($k_{DEC}$), and the molecular weights of $NH_3$ ($NH3_{MW}$) and the dosing agent ($DA_{MW}$). For example only, $NH3_{IN}$ may be determined using the following equation.

$$NH3_{IN} = \frac{DA_{IN} \cdot DA_{CONC} \cdot k_{DEC} \cdot NH3_{MW}}{DA_{MW}} \quad (2)$$

$DA_{CONC}$ is the percentage of the dosing agent present in the dosing agent solution (e.g., 32.5% indicates 0.325 parts dosing agent per 1 part dosing agent solution). $k_{DEC}$ is dependent on the type of dosing agent injected. For example only, $k_{DEC}$ may be 2.0, indicating that 2.0 mols of $NH_3$ result from the decomposition of 1.0 mol of dosing agent. $DA_{MW}$ is 60.06 g/mol in the case of urea, and $NH3_{MW}$ is 17.031 g/mol.

The current storage module 308 may determine $NH3_{USED}$ based upon, for example, $NOx_{US}$, $NOx_{DS}$, the molecular weights of NOx ($NOx_{MW}$) and $NH_3$ ($NH3_{MW}$), and the rate at which NH3 and NOx react ($k_{3OX}$) as described in equation (1) above. $NOx_{MW}$ is 46.055 g/mol in the case of $NO_2$. For example only, $NH3_{USED}$ may be determined using the following equation.

$$NH3_{USED} = \frac{[NOx_{US} - NOx_{DS}] \cdot NH3_{MW} \cdot k_{3OX}}{NOx_{MW}} \quad (3)$$

The current storage module 308 determines the current storage of the SCR catalyst 120 based upon the difference between $NH3_{IN}$ and $NH3_{USED}$ during a predetermined period of time. The storage ratio module 310 determines a storage ratio based upon the current storage and the maximum storage capacity.

In various implementations, the storage ratio may be the current storage divided by the maximum storage capacity. In various other implementations, the storage ratio may be a fraction of the current storage divided by the maximum storage capacity. This fraction may be a constant such as 0.9 (i.e., 90%). Alternatively, the fraction may be dependent upon SCR temperature. For example only, the fraction may decrease as SCR temperature increases. The fraction may provide a buffer such that when the maximum storage capacity is low (i.e., at high SCR temperatures), a significant error in the current storage calculation is necessary to cause slip.

The storage adjustment module 312 determines the second dose adjustment based upon the storage ratio. The second dose adjustment indicates an increase or decrease in $DA_{BASE}$ necessary to generate a desired ratio (or fraction) of current storage to maximum storage capacity. In various implementations, the second dose adjustment is determined based upon a mapping of storage ratio to dose adjustment. This mapping may be implemented in, for example, volatile or nonvolatile memory.

The dose adjustment module 314 receives $NH3_{OUT}$ from the NH3 sensor 244 and determines the first dose adjustment based upon $NH3_{OUT}$. The first dose adjustment indicates a reduction in $DA_{BASE}$ necessary to reduce or stop slip. For example only, the first dose adjustment decreases as $NH3_{OUT}$ increases. Additionally, the first dose adjustment may be 0.0 (indicating that no dosing is necessary) when $NH3_{OUT}$ is greater than or equal to a threshold. For example only, this threshold may be 50 ppm $NH_3$. In various implementations, the first dose adjustment is determined based upon a lookup table having a mapping of $NH3_{OUT}$ to dose adjustment. This lookup table may be implemented in volatile or nonvolatile memory.

The comparison module 316 also receives $NH3_{OUT}$ and generates a slip signal, which indicates that slip is occurring, when $NH3_{OUT}$ is greater than the slip threshold. For example only, the slip threshold may be 2.0 ppm $NH_3$. The comparison module 316 transmits the slip signal to the current storage module 308 and the selector module 318. In various implementations, the current storage module 308 sets the current storage equal to the maximum storage capacity upon receiving the slip signal.

The selector module 318 selects the first dose adjustment or the second dose adjustment based upon the slip signal. For example only, the selector module 318 selects the first dose adjustment when the slip signal is received. In various implementations, the selector module 318 may include a multiplexer as depicted, or a relay, a switch, or any other suitable device.

The dose determination module 320 receives $DA_{BASE}$ from the base dose module 302 and the dose adjustment selected by the selector module 318. The dose determination module 320 generates $DA_{IN}$ by adjusting $DA_{BASE}$ based upon the selected dose adjustment. In this manner, when slip is not occurring, $DA_{BASE}$ is adjusted based upon the second dose adjustment (i.e., the storage ratio). When slip is occurring, $DA_{BASE}$ is adjusted based upon the first dose adjustment (i.e., $NH3_{OUT}$).

Figure 3B:
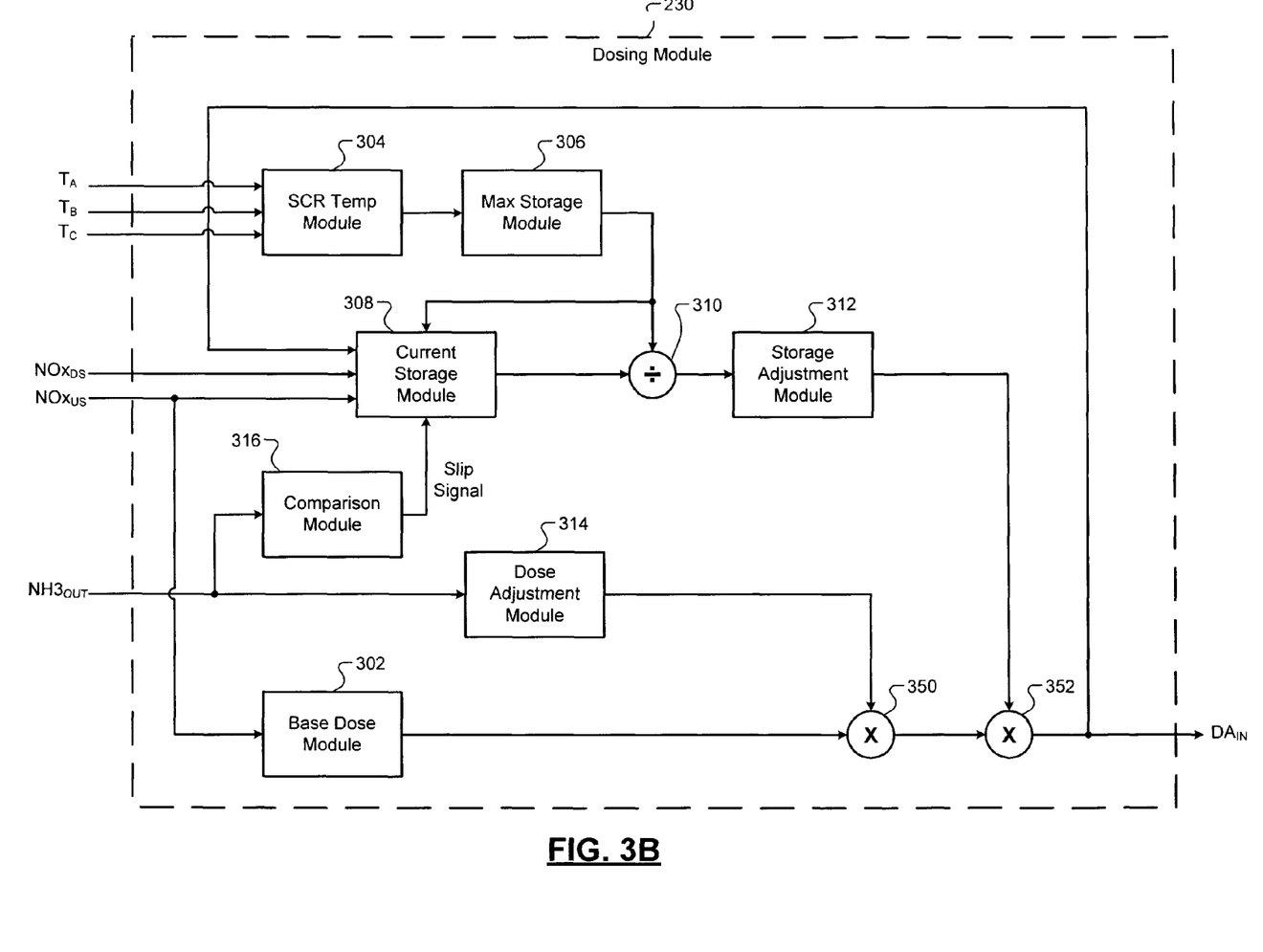

Referring now to FIG. 3B, another functional block diagram of an exemplary implementation of the dosing module 230 is presented. The dose adjustment module 314 receives $NH3_{OUT}$ from the NH3 sensor 244 and determines the first dose adjustment based upon $NH3_{OUT}$. For example only, the first dose adjustment approaches 1.0 as $NH3_{OUT}$ approaches a predetermined value, such as 0.0.

A first multiplier module 350 receives the first dose adjustment and $DA_{BASE}$ and multiplies the first dose adjustment and $DA_{BASE}$. The storage adjustment module 312 determines the second dose adjustment based upon the storage ratio. For example only, the second dose adjustment approaches 1.0 as the storage ratio approaches a predetermined value, such as 0.9 (corresponding to when current storage is equal to a predetermined percentage of the maximum storage capacity).

A second multiplier module 352 receives the second dose adjustment and the product of $DA_{BASE}$ and the first dose adjustment. The second multiplier module 352 multiplies the second dose adjustment with the product of $DA_{BASE}$ and the first dose adjustment, thereby generating $DA_{IN}$. Accordingly, in various implementations $DA_{IN}$ may be the product of the first dose adjustment, the second dose adjustment, and $DA_{BASE}$.

As stated above, the first dose adjustment approaches 1.0 as $NH3_{OUT}$ approaches the predetermined value (i.e., when slip is not occurring). Additionally, the second dose adjustment approaches 1.0 as the storage ratio approaches a predetermined value (i.e., when slip is not occurring). Accordingly, $DA_{BASE}$ will be adjusted based upon the first dose adjustment and will be not be adjusted based upon the second dose adjustment when slip is occurring. When slip is not occurring, $DA_{BASE}$ will be adjusted based upon the second dose adjustment and will not be adjusted based upon the first dose adjustment.

Figure 4:
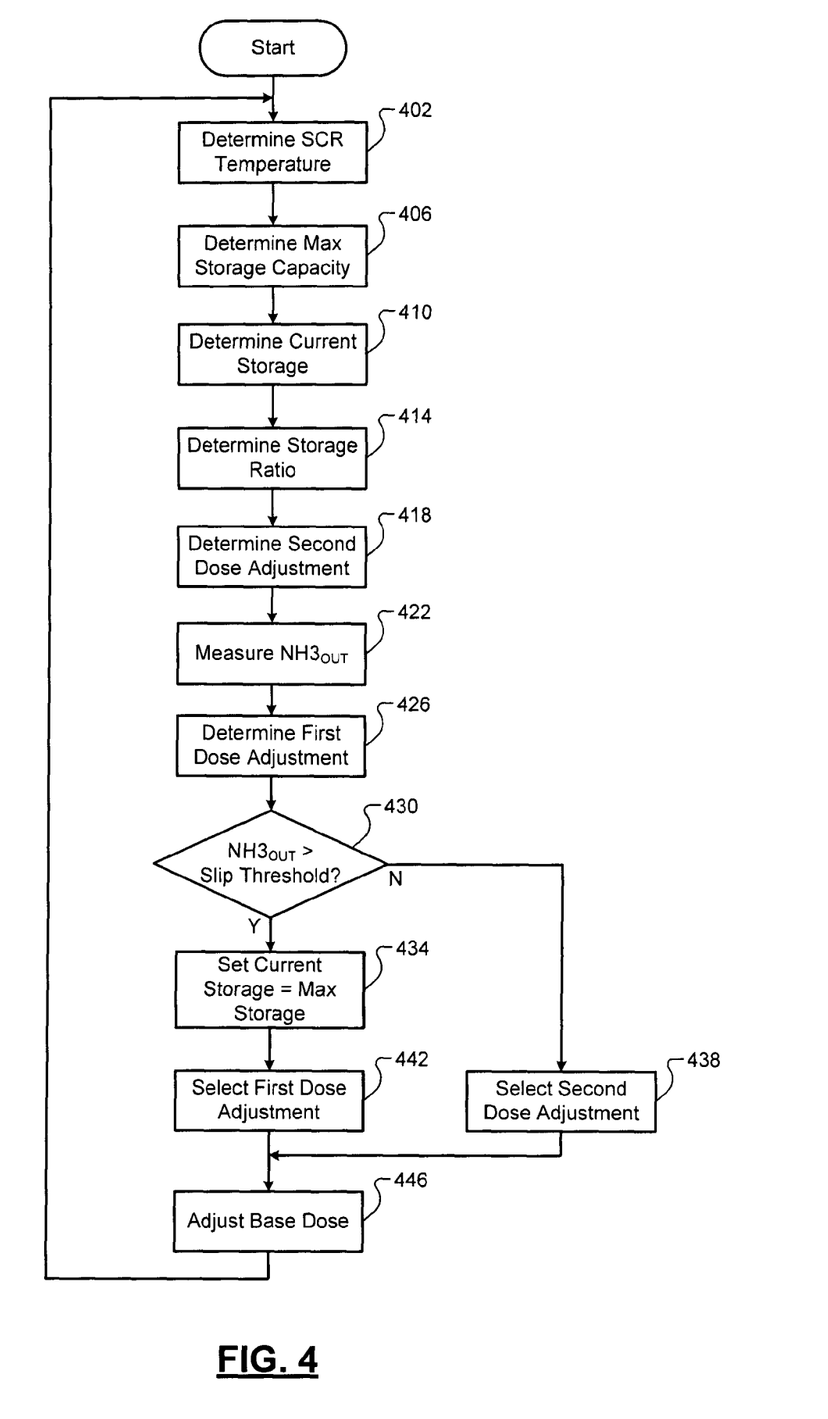
FIG. 4 is a flowchart depicting exemplary steps performed by the dosing module according to the principles of the present disclosure.

Referring now to FIG. 4, a functional block diagram depicting exemplary steps performed by the dosing module 230 is presented. Control may begin, for example, upon starting the engine 102. Control may determine the SCR temperature based upon, for example, $T_B$, and $T_C$. Control then continues in step 406 where control determines the maximum storage capacity. Control determines the maximum storage capacity based upon the SCR temperature.

Control continues in step 410 where control determines the current storage of the SCR catalyst 120. For example only, control may determine the current storage based upon the difference between $NH3_{IN}$ and $NH3_{USED}$. $NH3_{IN}$ and $NH3_{USED}$ may be calculated using equations (2) and (3), respectfully, as described above. In step 414, control determines the storage ratio. For example only, the storage ratio may be the current storage divided by the maximum storage capacity.

Control continues in step 418 where control determines the second dose adjustment. Control may determine the second dose adjustment based upon, for example, a mapping of storage ratio to dose adjustment. In step 422, control measures $NH3_{OUT}$, provided by the NH3 sensor 244. Control continues in step 426 where control determines the first dose adjustment. Control determines the first dose adjustment based upon $NH3_{OUT}$. For example only, control may determine the first dose adjustment based upon a mapping of $NH3_{OUT}$ to dose adjustment.

In step 430, control determines whether $NH3_{OUT}$ is greater than the slip threshold. If so, control continues in step 434; otherwise, control transfers to step 438. In step 434, control sets the current storage equal to the maximum storage capacity. Control then continues in step 442, where control selects the first dose adjustment, and control continues in step 446.

In step 438, control selects the second dose adjustment, and control continues in step 446. In step 446, control adjusts $DA_{BASE}$ based upon the selected dose adjustment, and control returns to step 402. For example only, when $NH3_{OUT}$ is greater than the slip threshold, control adjusts $DA_{BASE}$ based upon the first dose adjustment (i.e., $NH3_{OUT}$).

Figure 5:
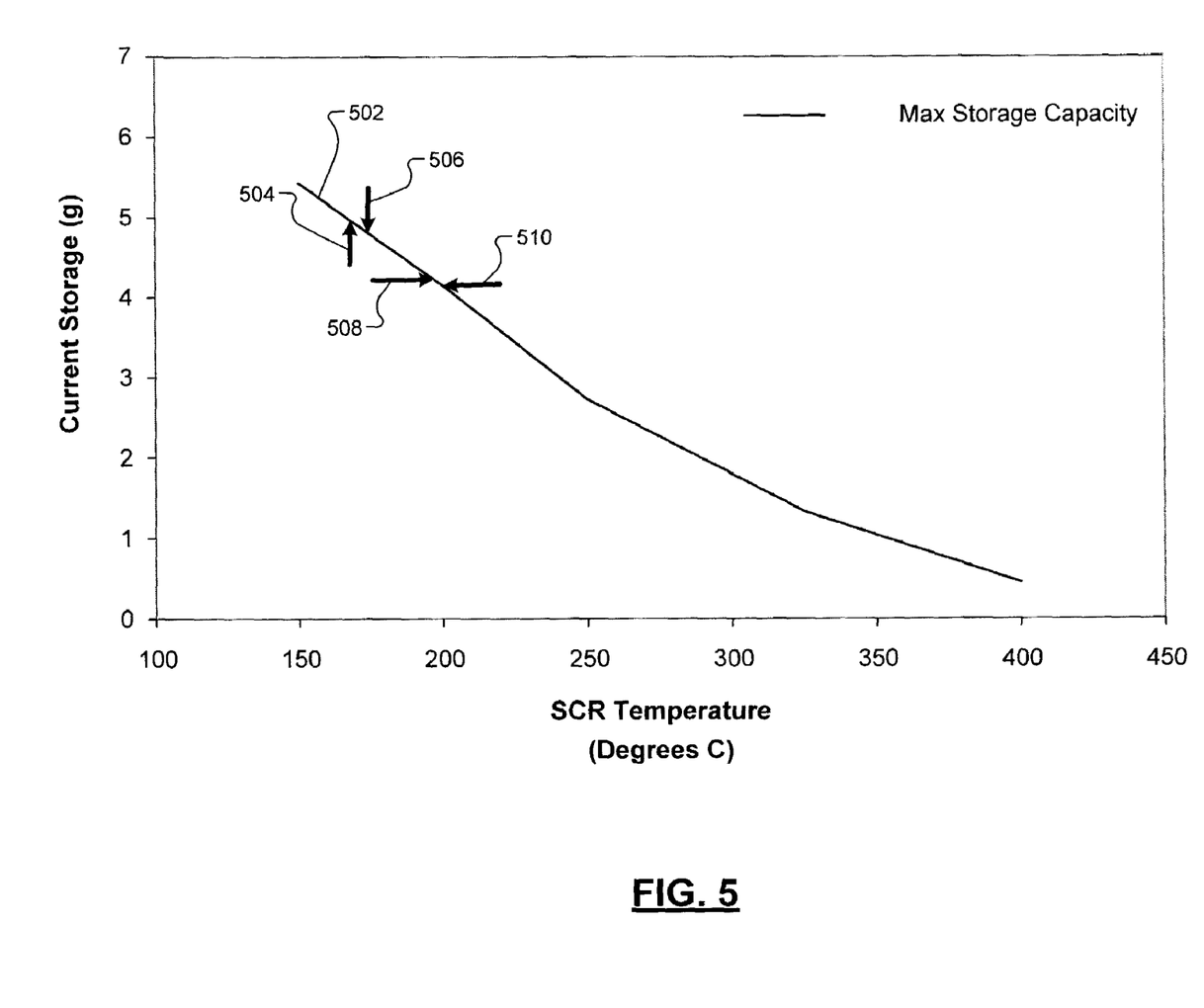
FIG. 5 is a graphical illustration of operation of the dosing module according to the principles of the present disclosure.

Referring now to FIG. 5, an exemplary graphical illustration of the operation of the dosing module is presented. Line 502 represents an exemplary the maximum storage capacity of the SCR catalyst 120. The dosing module 230 may attempt to maintain the current storage of the SCR catalyst 120 at or near the maximum storage capacity, as depicted by arrow 504. For example only, the dosing module 230 may maintain the current storage at a predetermined percentage of the maximum storage capacity, such as 90%. The dosing module 230 determines the storage ratio (the ratio of the current storage to the maximum storage capacity) and adjusts $DA_{BASE}$ based upon the storage ratio when slip is not occurring.

Aging and other variables may cause slight error in the determination of the current storage. Such errors may cause slip. The dosing module 230 determines whether slip is occurring based upon $NH3_{OUT}$. For example, the dosing module 230 may determine when slip is occurring when $NH3_{OUT}$ is greater than a threshold. When slip occurs, the dosing module 230 adjusts $DA_{BASE}$ based upon $NH3_{OUT}$, as depicted by arrow 506. As slip occurs when the current storage is equal to the maximum storage capacity, the dosing module 230 may set the current storage equal to the max storage capacity when slip occurs.

The maximum storage capacity of the SCR catalyst 120 may be dependent upon the temperature of the SCR catalyst 120. For example only, the maximum storage capacity decreases as the temperature of the SCR catalyst 120 increases. As stated above, the dosing module 230 adjusts $DA_{BASE}$ based upon the storage ratio when slip is not occurring, as depicted by arrow 508. However, an increase in temperature of the SCR catalyst 120 may cause slip. Slip may be caused by the decrease in maximum storage capacity attributable to the increase in SCR temperature. Accordingly, the dosing module 230 adjusts $DA_{BASE}$ based upon $NH3_{OUT}$ when slip is occurring, as depicted by arrow 510. In this manner, the dosing module 230 maximizes conversion efficiency while minimizing slip.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
generating a base dose signal that corresponds to a mass flow rate of a dosing agent;
a receiving an ammonia (NH3) signal indicating NH3 measured downstream of a catalyst;
determining a first dose adjustment based upon the NH3 signal;
determining a maximum NH3 storage capacity of the catalyst;
determining a mass of NH3 currently stored by the catalyst;
determining a storage ratio based upon the currently stored mass and the maximum storage capacity;
determining a second dose adjustment based upon the storage ratio;
selecting one of the first dose adjustment and the second dose adjustment based upon a comparison of the NH3 signal and a threshold; and
generating a dosing signal based upon the base dose signal and the selected one of the first and second dose adjustments.

2. The method of claim 1 further comprising:
selecting the first dose adjustment when the NH3 signal is greater than the threshold; and
selecting the second dose adjustment when the NH3 signal is one of less than and equal to the threshold.

3. The method of claim 1 further comprising determining the dosing signal based on a product of the base dose signal and the selected one of the first and second dose adjustments.

4. The method of claim 1 further comprising supplying the dosing agent to the catalyst based upon the dosing signal.

5. The method of claim 1 further comprising selectively setting the mass of NH3 stored by the catalyst equal to the maximum NH3 storage capacity based on the comparison.

6. The method of claim 5 further comprising setting the mass of the NH3 stored by the catalyst equal to the maximum storage capacity when the NH3 signal is greater than the threshold.

7. The method of claim 1 further comprising determining the second dose adjustment based upon a fraction of the storage ratio.

8. The method of claim 7 further comprising determining the fraction based upon a temperature of the catalyst.

9. A dosing module for a vehicle, comprising:
a base dose module that generates a base dose signal that corresponds to a mass flow rate of a dosing agent;
a dose adjustment module that receives an ammonia (NH3) signal and that determines a first dose adjustment based upon the NH3 signal, wherein the NH3 signal indicates NH3 measured downstream of a catalyst;
a max storage module that determines a maximum NH3 storage capacity of the catalyst;
a current storage module that determines a mass of NH3 currently stored by the catalyst;

a storage ratio module that determines a storage ratio based upon the currently stored mass and the maximum NH3 storage capacity;
a storage adjustment module that determines a second dose adjustment based upon the storage ratio;
a selector module that selects one of the first dose adjustment and the second dose adjustment based upon a comparison of the NH3 signal and a threshold; and
a dose determination module that generates a dosing signal based upon the base dose signal and the selected one of the first and second dose adjustments.

10. The dosing module of claim 9 wherein the selector module selects the first dose adjustment when the NH3 signal is greater than the threshold and selects the second dose adjustment when the NH3 signal is one of less than and equal to the threshold.

11. The dosing module of claim 9 wherein the dose determination module determines the dosing signal based on a product of the base dose signal and the selected one of the first and second dose adjustments.

12. An exhaust treatment system comprising:
the dosing module of claim 9;
an NH3 sensor that generates the NH3 signal; and
a dosing agent injector that supplies the dosing agent to the catalyst based upon the dosing signal.

13. The dosing module of claim 9 wherein the current storage module selectively sets the mass of NH3 stored by the catalyst equal to the maximum NH3 storage capacity based on the comparison.

14. The dosing module of claim 13 wherein the current storage module sets the mass of the NH3 stored by the catalyst equal to the maximum storage capacity when the NH3 signal is greater than the threshold.

15. The dosing module of claim 9 wherein the storage adjustment module determines the second dose adjustment based upon a fraction of the storage ratio.

16. The dosing module of claim 15 wherein the fraction is determined based upon a temperature of the catalyst.

* * * * *